(12) United States Patent
Haehnichen et al.

(10) Patent No.: US 8,068,819 B2
(45) Date of Patent: Nov. 29, 2011

(54) SYSTEM AND METHOD FOR INCREASED WIRELESS COMMUNICATION DEVICE PERFORMANCE

(75) Inventors: Steven Haehnichen, San Diego, CA (US); Diego Kaplan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 248 days.

(21) Appl. No.: 11/042,854

(22) Filed: Jan. 24, 2005

(65) Prior Publication Data

US 2006/0166663 A1 Jul. 27, 2006

(51) Int. Cl.
*H04M 3/42* (2006.01)

(52) U.S. Cl. .............. 455/414.1; 455/418; 455/419

(58) Field of Classification Search ........... 455/414.1, 455/419–420, 517
See application file for complete search history.

(56) References Cited

U.S. PATENT DOCUMENTS

| | | | | |
|---|---|---|---|---|
| 6,141,705 A * | 10/2000 | Anand et al. | | 710/15 |
| 6,160,509 A * | 12/2000 | Graziani et al. | | 342/357.09 |
| 6,594,484 B1 * | 7/2003 | Hitchings, Jr. | | 455/414.1 |
| 6,714,778 B2 * | 3/2004 | Nykanen et al. | | 455/414.1 |
| 6,914,891 B2 * | 7/2005 | Ha et al. | | 370/338 |
| 7,013,424 B2 * | 3/2006 | James et al. | | 715/513 |
| 2002/0040326 A1 * | 4/2002 | Spratt | | 705/26 |
| 2002/0052195 A1 * | 5/2002 | Lee | | 455/414 |
| 2003/0004937 A1 * | 1/2003 | Salmenkaita et al. | | 707/3 |
| 2003/0046337 A1 * | 3/2003 | Strahm et al. | | 709/203 |
| 2004/0176958 A1 * | 9/2004 | Salmenkaita et al. | | 704/275 |
| 2005/0193097 A1 * | 9/2005 | Guthrie et al. | | 709/219 |
| 2006/0009980 A1 * | 1/2006 | Burke et al. | | 704/270 |
| 2006/0033731 A1 * | 2/2006 | Suen et al. | | 345/418 |

* cited by examiner

*Primary Examiner* — Charles Appiah
*Assistant Examiner* — Jaime Holliday

(57) ABSTRACT

One way to deliver increased wireless communication device performance without using a higher performance processor is to offload processor functions in a wireless communications device. In one example a wireless device selects a processor function to be performed for the wireless device and evaluates the selected processor function to determine whether to offload the processor function. If it is determined that the processor function can be offloaded the wireless device transmits a wireless request to a remote processor to perform the offload processor function. After performing the processor function at the remote processor and generating a result the wireless device receives the result.

25 Claims, 10 Drawing Sheets

SYSTEM AND METHOD FOR INCREASED WIRELESS COMMUNICATION DEVICE PERFORMANCE

FIELD

This invention relates generally to communication devices and, more particularly to wireless communication devices.

BACKGROUND

The increased number and complexity of operations performed in a wireless communication device requires a corresponding increase in processor performance and memory to implement the operations. One particular complex set of operations involves the generation of displays for a wireless device screen. An example is displaying World Wide Web pages associated with the use of an Internet browser in a wireless device. Wireless device Internet browsers generally accept Wireless Application Protocol (WAP) and HyperText Markup Language (HTML) messages containing text-based Web pages, graphic information such as page layout and fonts, and hypertext links from an Internet site. Converting WAP and HTML messages to a format suitable for display on a wireless device user interface requires large amounts of processor performance and memory.

It is known to use the processor and memory in a wireless device to generate displays, for example, to process WAP and HTML messages. It is also known to use a processor with increased performance and to increase the amount of memory in a wireless device to facilitate the generation of displays and the processing of WAP and HTML messages. However, there are disadvantages associated with using a wireless device processor and memory and increasing wireless device processing performance and memory. Using the wireless device processor increases the complexity of the software required in the device and can reduce the time available for processing other software tasks. In addition, wireless device batteries have limited capacities for storing and supplying power, and processor operations consume battery power. Using wireless device memory reduces the amount of memory available in the wireless device for other purposes. Additionally, larger memories drive up costs.

Advances in technology and manufacturing techniques permit wireless communication devices to be made increasingly smaller, creating in turn, a need to generally reduce the number and size of components in the devices. Unfortunately, increasing processor performance and memory in a wireless device can increase the number and size of processor and memory components in a wireless device. The subsequent increase in space usage can limit the size to which a wireless device can be reduced, or can limit the space available in a wireless device for other components. Increasing processor performance and memory in a wireless device usually increases the cost of processor and memory components for the wireless device, adding to the cost of producing the wireless device. In addition, since general reliability decreases as parts count and complexity in a wireless device increase, increasing processor performance and memory as noted above, may tend to decrease the reliability of the wireless device.

It would be advantageous if functionality in wireless communication devices requiring large amounts of processor performance and memory, such as displays on a wireless communication device screen, could be implemented in a wireless device with minimal use of the wireless device processor and memory.

SUMMARY

Wireless communication device users generally want wireless communication devices with more features at a lower cost. Additionally, they generally want smaller and lighter wireless communication devices. One problem with wireless communication devices is limited processor performance. While it is true that processor performance has increased over time, consumer demand for higher performance has also increased. The trend of increasing processor performance and increasing consumer demand for higher performance may continue. Generally higher performance processors are more expensive, additionally they may be physically larger and consume more power. A larger processor may increase the size of a mobile communication device.

One way to deliver increased wireless communication device performance without using a higher performance processor is to offload processor functions in a wireless communications device. In one example the wireless device selects a processor function to be performed for the wireless device and evaluates the selected processor function to determine whether to offload the processor function. If it is determined that the processor function can be offloaded the wireless device transmits a wireless request to a remote processor to perform the offload processor function. After performing the processor function at the remote processor and generating a result the wireless device receives the result.

Offloading processor functionality will tend to allow higher performance processing to be used without increasing the size of the wireless communication device. Additionally, the increased processing functionality will generally not increase the cost of the wireless communication device. Processors that are not located within the wireless device will tend to be able to process more complex functions at lower cost. Increased processor performance is not dependent on slow growth of the mobile station modem (MSM), a type of processor used in some wireless devices. Additionally, external processing is scaleable and can grow over time, in some cases allowing wireless communication device users increased functionality without requiring them to purchase new devices.

BRIEF DESCRIPTION OF THE DRAWINGS

For a more complete understanding of the present invention, and the advantages thereof, reference is now made to the following descriptions taken in conjunction with the accompanying drawings, tables and attachments, in which.

DETAILED DESCRIPTION

Figure 1:
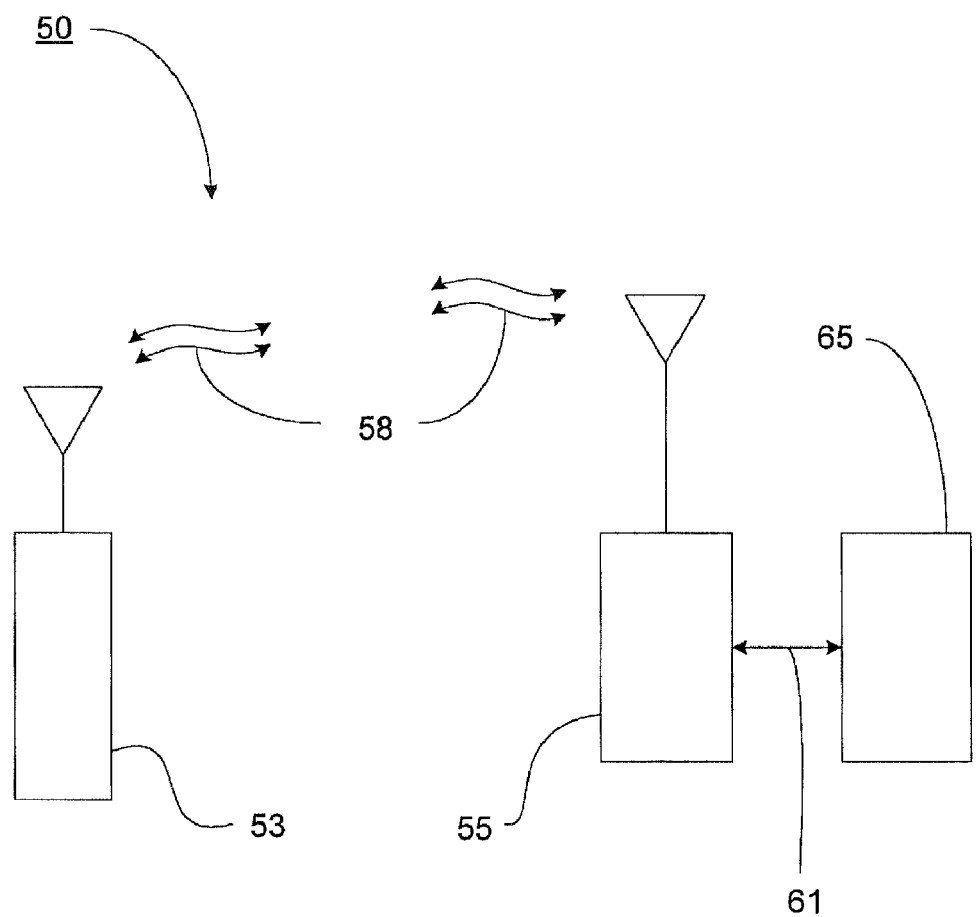
FIG. 1 shows a diagram of a wireless communication device communicating with a base station.

Referring now to FIG. 1 a diagram 50 is shown. The diagram 50 depicts a wireless communication device in the form of a mobile handset 53. The mobile handset 53 can offload processor functions to a remote processor 65. The mobile handset 53 uses transmissions 58 to communicate with the transceiver 55. The mobile handset 53 and transceiver 55 form part of a communication network. The transceiver 55 uses a connection 61 to communicate with a remote processor 65. The remote processor 65 is used to offload processor functions from the mobile handset. It will be understood that the transceiver 55 could be part of a base station. In addition to functionality typically performed by a base station, this base station communicates with the remote processor 65 to process offloaded processor functions from the mobile handset 53.

In one example, as discussed above, the mobile handset 53 selects a processor function to be performed for the mobile handset and evaluates the selected processor function to determine whether to offload the processor function. If it is determined that the processor function can be offloaded the mobile handset 53 transmits a wireless request over the air as shown by transmissions 58 to a remote processor 65 to perform the offload processor function. As shown in FIG. 1 the transmission 58 between the remote processor and mobile handset 53 is received by the transceiver 55 and passed along to the remote processor 65. However, it will be clear to one of skill in the art that a remote processor connected to a transceiver that is associated with a base station could be used. After performing the processor function at the remote processor 65 and generating a result the mobile handset 53 receives the result.

Figure 2:
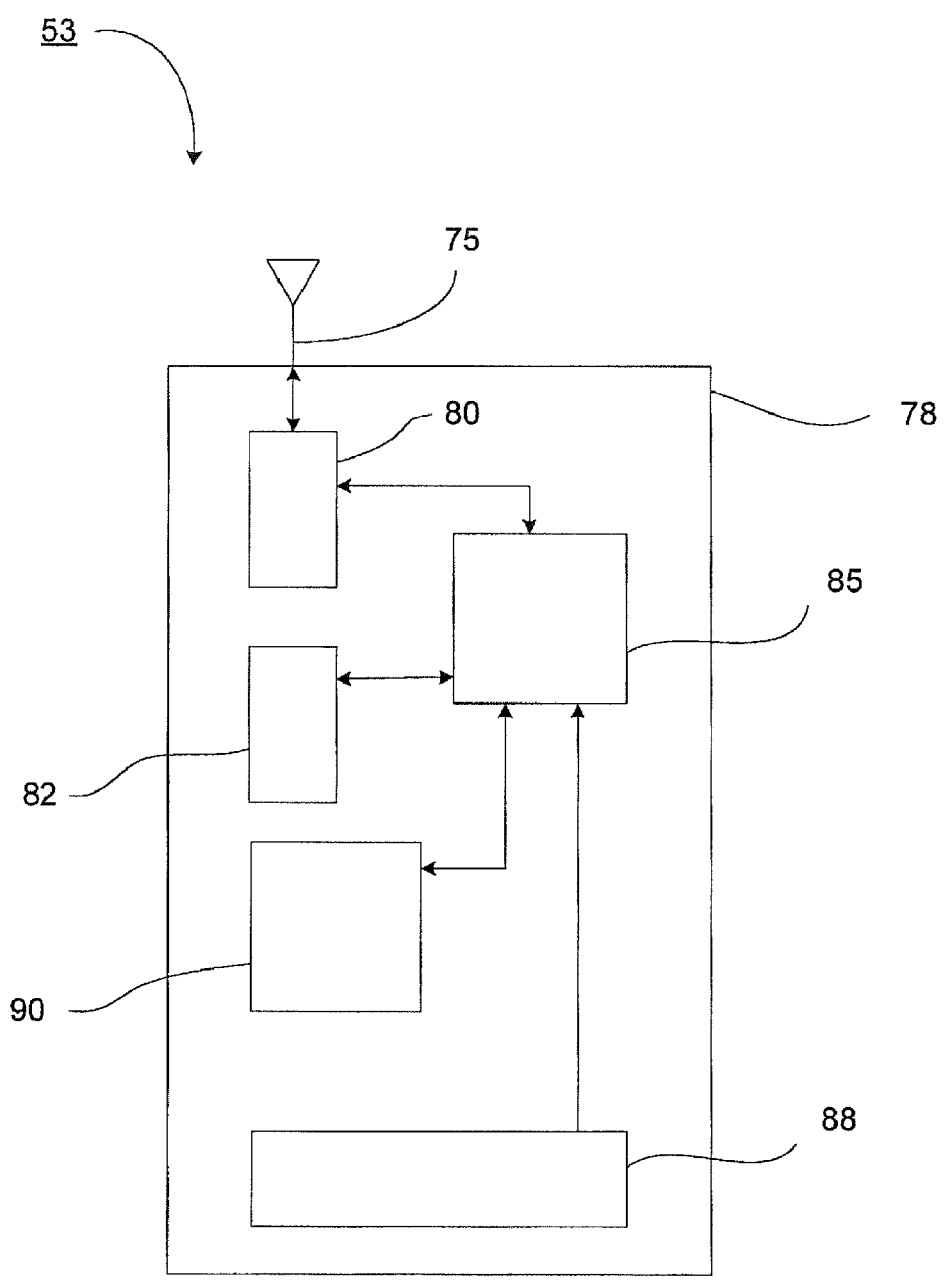
FIG. 2 shows a block diagram of a wireless communication device.

FIG. 2 depicts an example mobile handset 53 in more detail. The increased detail will show specific components of the mobile handset 53 and how the components can interrelate. Additionally, specific possible advantages related to the components will be given. The mobile handset 53 includes an antenna 75 for sending and receiving signals. The antenna 75 is connected to a transceiver 80. The transceiver 80 is a device that includes both a transmitter and a receiver. The transceiver 80 is coupled to a processor 85. The processor 85 is used to perform signal processing functions as well as perform some user interface processing functions. However, the processing performed by the processor 85 will generally tend to be minimal since much of the complicated processing can be preformed remotely. It will be understood that the processor 85 could be a single processor, multiple processors, some collection of digital logic, or other devices and possible software that can perform processing functions. Additionally, the processor could be the same processor used for communication signal processing or it could be a separate processor. The processor 85 is connected to a memory 82. The memory is used to store information used by the processor 85. The processor 85 is also coupled to a user interface 90. The user interface 90 may include a screen. Additionally, the user interface 90 may include a keypad. It will be understood that other input or output devices may be part of the user interface. Additionally, the processor 85 is coupled to a battery 88. The battery 88 is used to supply power to the processor 85. It will be understood that the battery could be any form of mobile power source, including, but not limited to fuel cells, batteries, or any other portable power source.

As stated above, using external processors can lead to the use of a smaller processor and less memory on a mobile handset. Additionally, the power used by a smaller processor may be lower. However, in some cases power saved by using a smaller processor may be more than offset by increased power use by transmitting offloaded processor functions to the transceiver for processing by the remote processor. Offloading processor functionality will generally increase performance without increasing cost. Additionally, external processing is scaleable and can grow over time.

As an example, a mobile handset 53 includes a keypad and a screen as part of the user interface 90. A key is pressed. The key being pressed causes the mobile handset 53 to transmit a request to the remote processor 65. The request is sent through the transceiver 55 that is connected to the remote processor 65. The remote processor 65 performs the processor function. In this specific example the key pressed causes a change on the mobile handset screen. The updated mobile handset screen data is transmitted from the remote processor using the transceiver 55. The updated mobile handset screen information is received by the mobile handset 53 and displayed on the mobile handset screen. It will be understood that this is an example. Other examples are possible. It will also be understood that a mobile handset user may cause remote processing directly, for example, by pressing a key, or indirectly.

Figure 3:
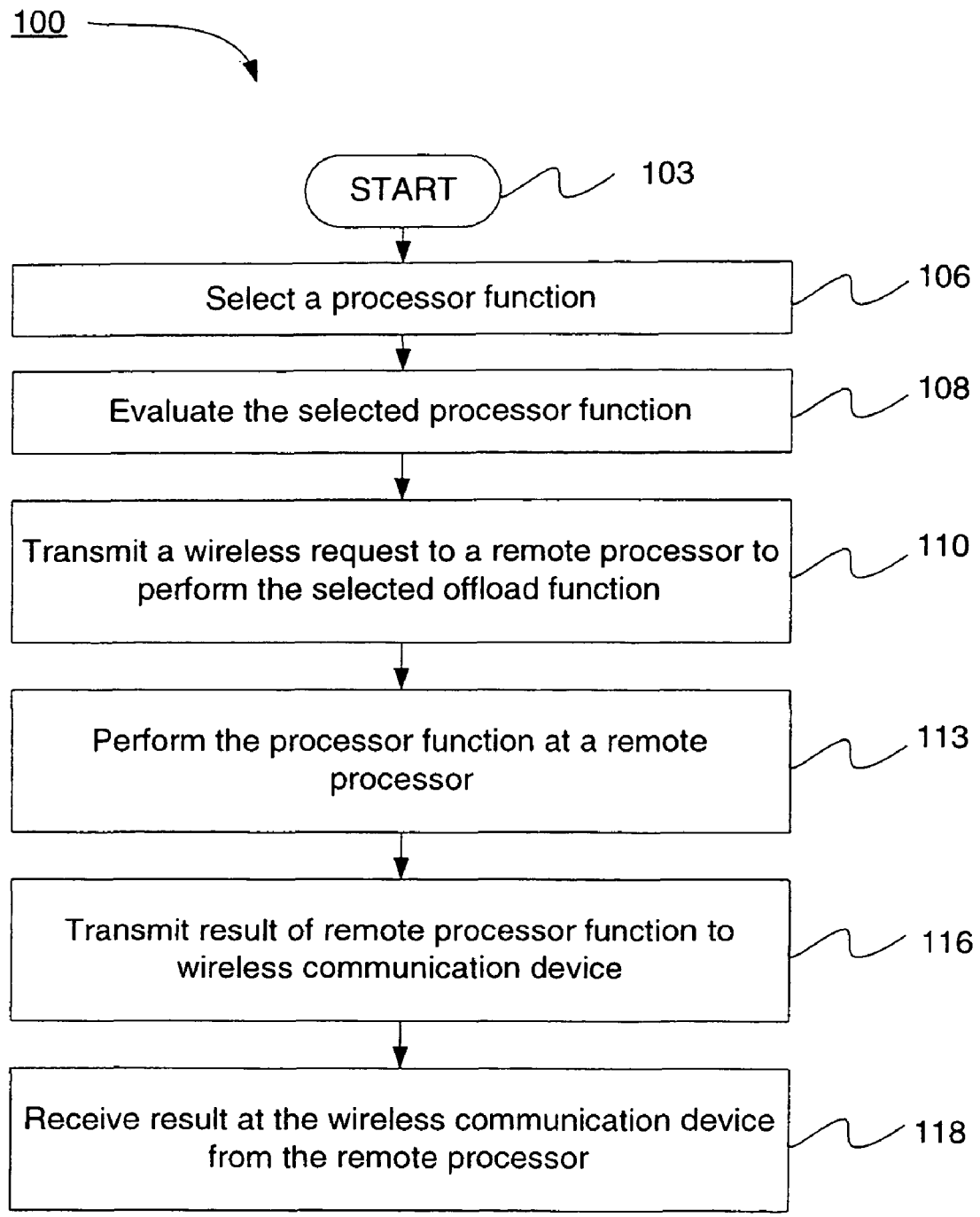
FIG. 3 is a flowchart illustrating an embodiment in which a processor function is selected to be performed remotely.

Referring now to FIG. 3 a flowchart 100 will be discussed. Some of the steps of flowchart 100 could, for example, be performed by the processor 85 shown in FIG. 2. Recall that the processor 85 was part of the mobile handset 53 shown in FIGS. 1 and 2.

The flowchart 100 begins at 103. In step 106 a processor function is selected. The processor function selected in step 106 is evaluated in step 108. A wireless request is transmitted to a remote processor to perform the offloaded processor function in step 110. As discussed with respect to FIG. 1 the remote processor may be the remote processor 65 as shown in FIG. 1 that is connected to a transceiver 55. As stated above, the remote processor may be connected to a transceiver that is also part of a base station. Additionally, as the process shown in the flowchart 100 the process may be used on many wireless communication devices, including mobile handsets. It will be clear to one of skill in the art that the process shown in the flowchart 100 may also be used with wireless communication devices that use wireless communications systems that do not need a base station.

The flowchart 100 continues at step 113. At step 113 the processor function is performed at the remote processor. Note that step 113 occurs at the remote processor. A wireless device such as the mobile handset 53 shown on FIGS. 1 and 2 does not perform this step. The result of the processor function is then transmitted back to the wireless communication device in step 116 and received be the wireless device in step 118. Performing the selected processor function remotely can free up processing power on the wireless device, allowing smaller processors to be used. Alternatively, other processing tasks can be performed on the wireless device. It will be understood by one of skill in the art that step 113 and 116 are not performed on the wireless communication device.

Figure 4:
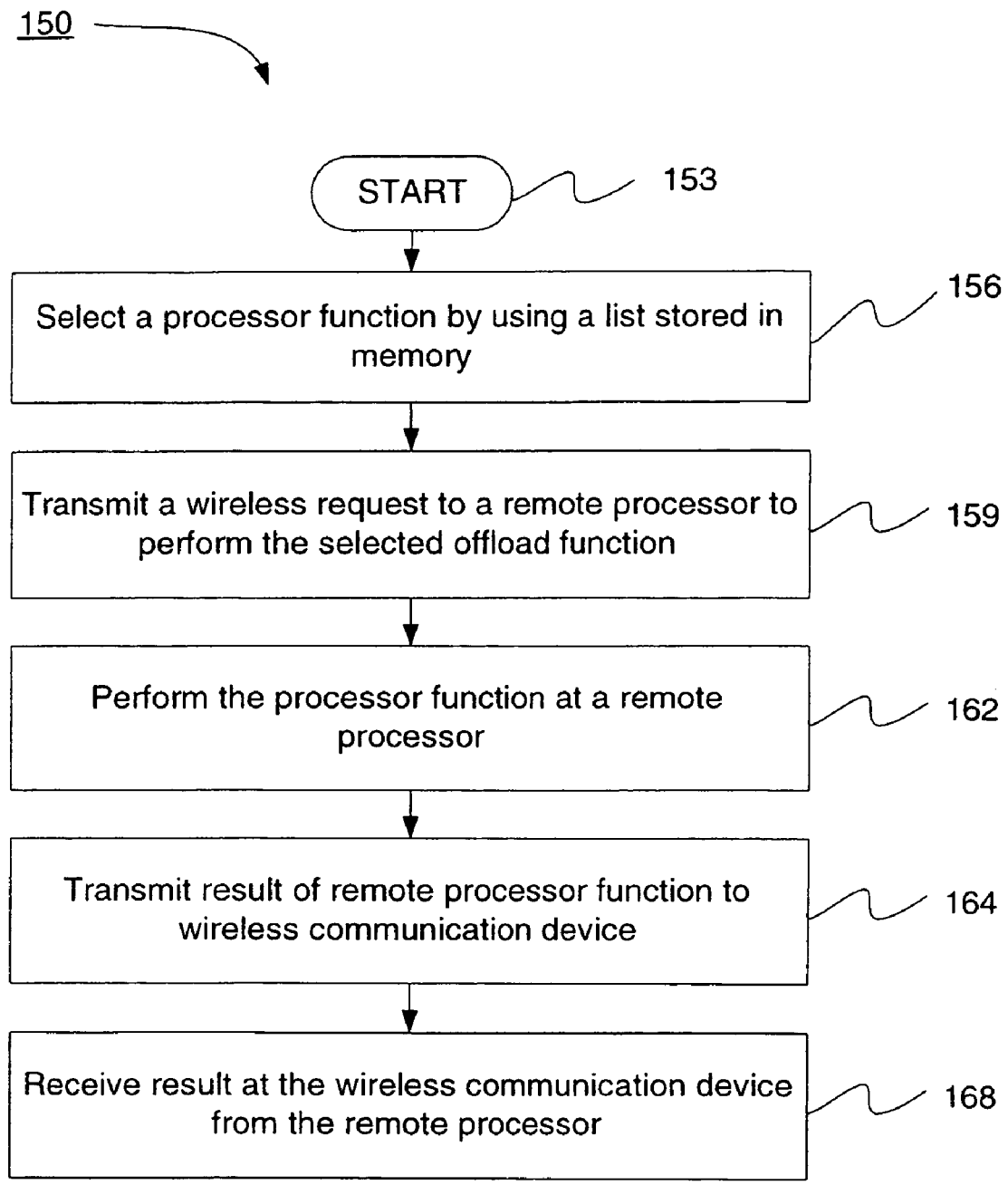
FIG. 4 is a flowchart illustrating an embodiment in which a processor function for remote processing is selected by using a list of processor functions stored in memory.

FIG. 4 shows another flow chart 150. The flowchart 150 is similar to the flowchart 100 shown in FIG. 3. The flowchart 150 shows a process in which the processor function is selected using a list stored in memory.

The flowchart 150 begins at step 156. In step 156 the processor function is selected, similar to step 106 of FIG. 3. However, in step 156, more detail is shown of one possible way to select the processor function. As stated above, a list is used to select the processor function. The list is stored in a memory in the wireless communication device. It should be noted that this is only an example of one possible way to select a processor function. Other ways are possible. Another example will be shown with respect to FIG. 5.

Returning to FIG. 4, the flowchart 150 continues with step 159. In step 159 a wireless request is transmitted to a remote processor to perform the offloaded processor function. Step 159 is similar to step 110 of FIG. 3. The remote processor performs the offloaded processor function in step 162, similar to step 113 of FIG. 3. At step 164 the result of the processor function is then transmitted back to the wireless communication device and the results are received at the wireless communication device in step 168. Step 168 is similar to step 118 of FIG. 3. It will be understood by one of skill in the art that steps 162 and 164 are not performed on the wireless communication device, similar to steps 113 and 116 of FIG. 3.

Figure 5:
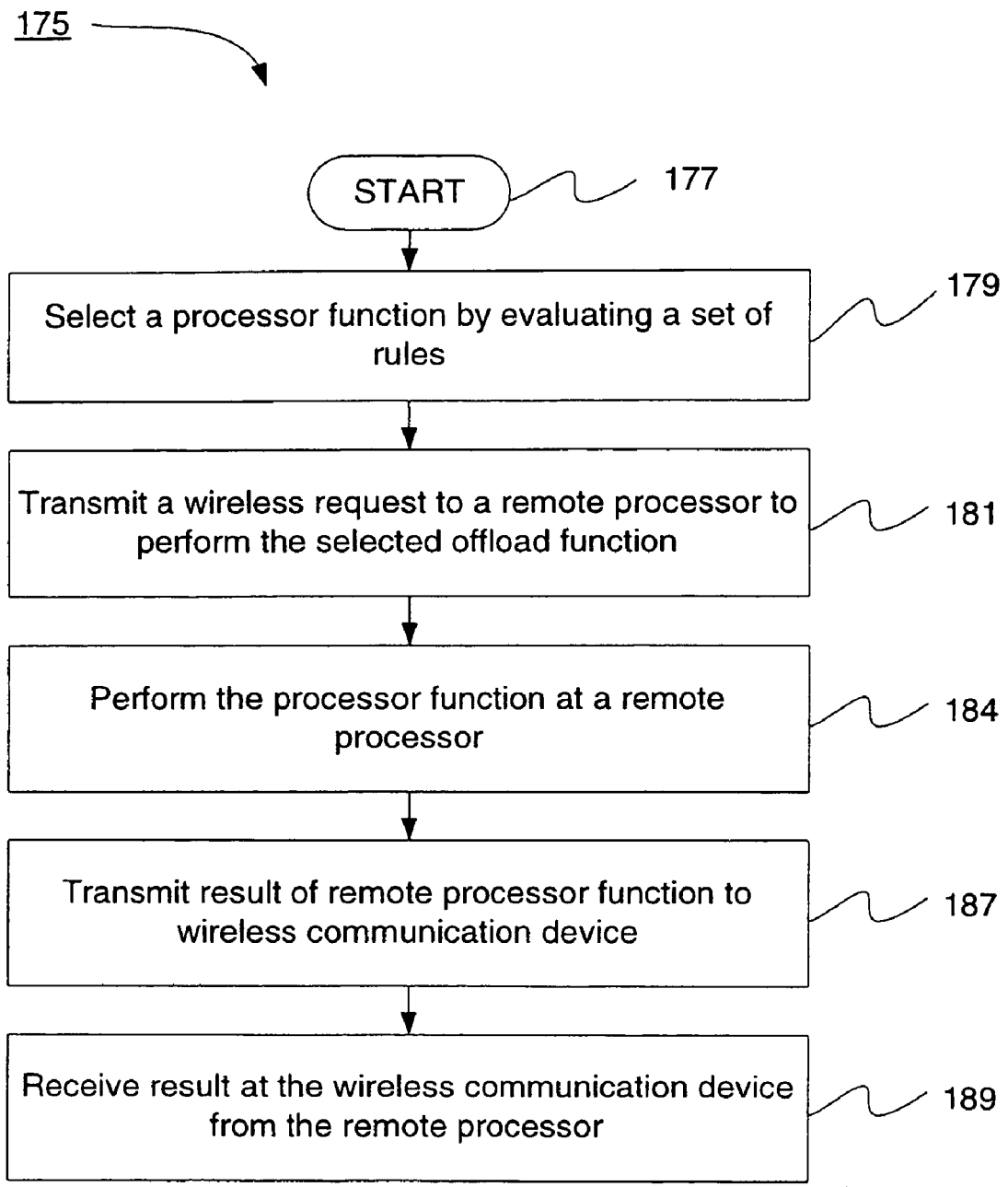
FIG. 5 is a flowchart illustrating an embodiment in which a processor function for remote processing is selected by evaluating a set of rules.

As stated above, FIG. 5 shows another way to select a processor function for offloading. FIG. 5 is a flowchart 175 showing a method of offloading a processor function. The flowchart 175 differs from flowcharts 100 and 150 in that the flowchart 175 shows selecting a processor function by evaluating a set of rules. The flowchart 175 begins at 177. At step 179 a processor function is selected using a set of rules that are evaluated in the wireless communication device. Step 179 is similar to steps 106 and 156 of FIGS. 3 and 4. However, in step 179 a set of rules are used to determine if a processor function should be offloaded. In step 181 a wireless request is transmitted to a remote processor to perform the offloaded processor function. Step 181 is similar to steps 110 and 159 in FIGS. 3 and 4. The processor function is performed at the remote processor in step 184, similar to steps 113 and 162 of FIGS. 3 and 4. The result of the remote processor function is transmitted to the wireless communication device in step 187. In step 189 the results are received at the wireless device from the remote processor in step 189. Step 189 is similar to steps 118 and 168 of FIGS. 3 and 4. It will be understood by one of skill in the art that steps 184 and 187 are not performed on the wireless communication device, similar to steps 113 and 116 of FIG. 3 and steps 162 and 164 of FIG. 4.

Figure 6:
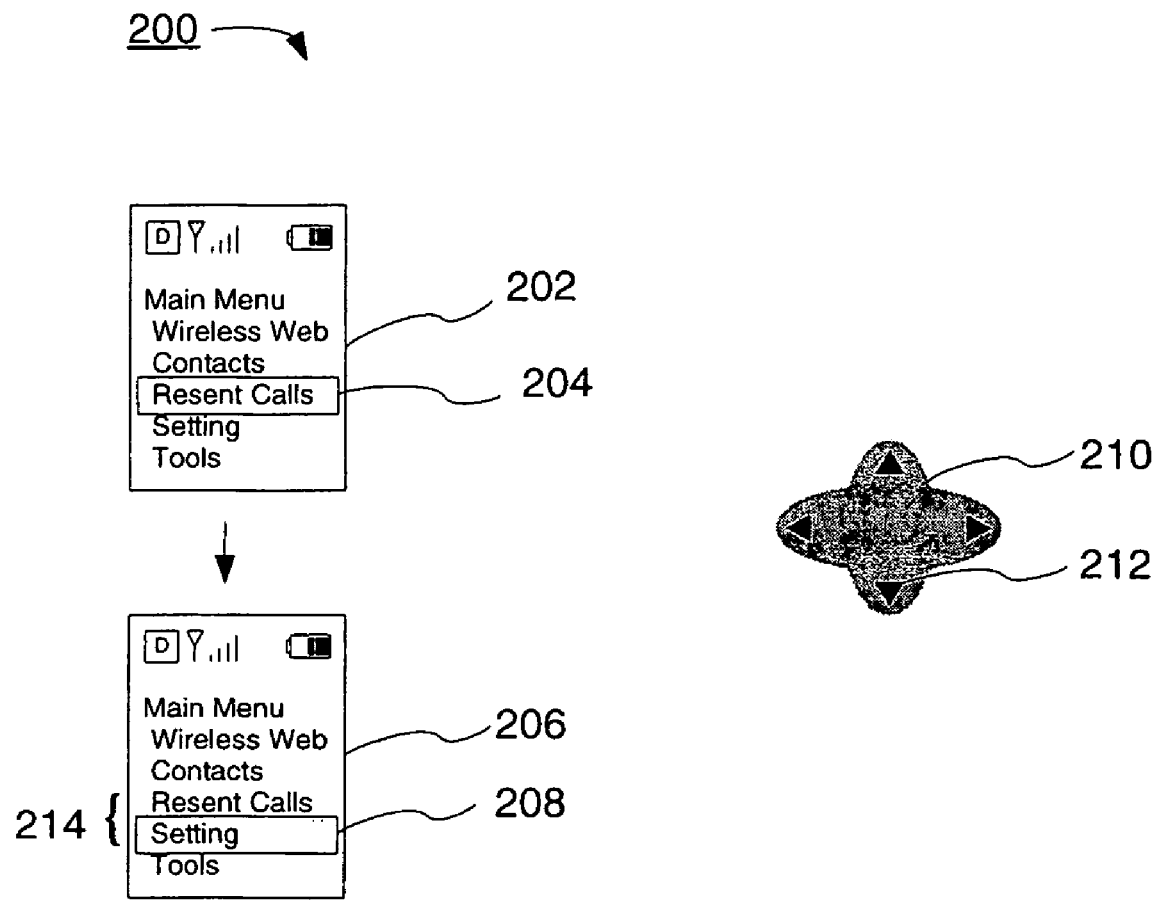
FIG. 6 is a diagram illustrating several wireless communication device screens.

One example of wireless communication device processing that can be done remotely is processing related to the wireless communication device screen. An example of wireless communication device processing will now be discussed with respect to FIG. 6. FIG. 6 shows a diagram 200. The diagram 200 depicts two wireless communication device screen views 202 and 206. The wireless communication device screen views 202 and 206 show the screen before and after the down arrow key 212 is pressed. The screen view 202 includes a selected menu item 204, similarly, the screen view 206 includes a selected menu item 208. Shown to the right of the screen views 202 and 208 an arrow keypad 210 is shown. If the down arrow key 212 is pressed a typical mobile handset as shown in diagram 200 would cause the selected menu item 204 on screen view 202 to shift as shown to selected menu item 208 on screen view 206.

Processing needed to create the display shown on the screen 206 can be done remotely. When a wireless communication device user pushes the down arrow key 212 a signal is transmitted to the remote processor over the air by way of a transceiver, as discussed with respect to FIG. 1. The remote processor determines what changes if any to make to the display based on the user input of pushing the down arrow key 212. The processor then causes information to be transmitted to the wireless communication device for display on the screen as shown in screen view 206. FIG. 6 also shows a changed portion 214 of the screen view 206. The amount of information transmitted back to the wireless device can be lowered if only the changed portion of the display shown on screen view 206 is transmitted.

The example shown with respect to FIG. 6 is only one possible example. In some cases a screen view may change without user input. For example, when a call is received the wireless communication device screen may change without input from that user. The change to device screen may be processed remotely. Additionally, remote processing of wireless communication device screen views such as 202 and 206 are only examples. Remote processing may be used to process information not related to a display on a wireless communication device.

Processing screen views such as 202 and 206 remotely has many advantages as stated above. One specific advantage highlighted on FIG. 6 is only transmitting the changed portion 214 of the screen view 206. By only transmitting the changed portion 214 of the screen view 206 the amount of information that is transmitted is decreased. However, it should be noted that in some embodiments entire screen views may be transmitted.

Figure 7:
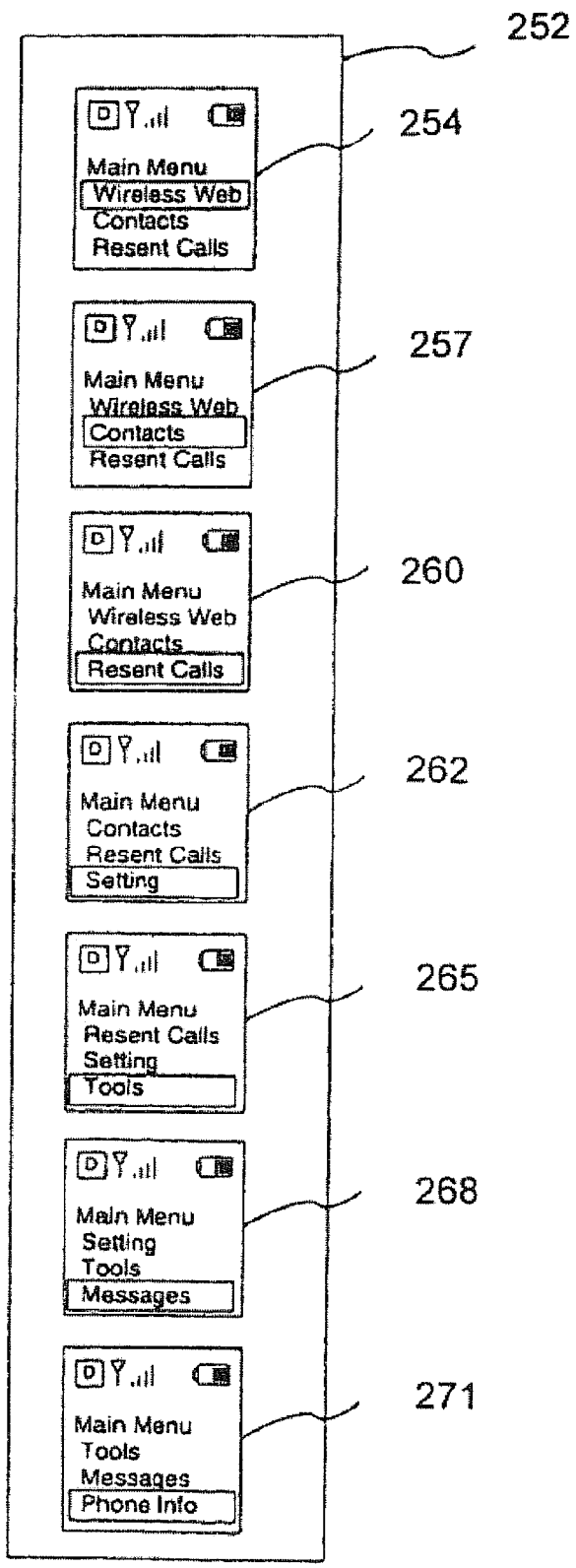
FIG. 7 is a diagram illustrating several wireless communication device screens.

Referring now to FIG. 7 another set of screen views 254, 257, 260, 262, 265, 268, 271 will now be discussed. FIG. 7 is a diagram 250 showing another embodiment. Similar to FIG. 6, FIG. 7 shows screen views 254, 257, 260, 262, 265, 268, 271, however, the screen views 254, 257, 260, 262, 265, 268, 271 are representations of information stored in a memory 252. In cases where processing performance is limited but memory is available, several preprocessed screen views, for example screen views 254, 257, 260, 262, 265, 268, 271, can be stored. In this example, the result of different inputs is determined at a remote processor and the screens views 254, 257, 260, 262, 265, 268, 271 are stored in memory. One possible set of different inputs for these potential outputs would be a varying number of depresses of the down or up arrow keys. Recall the down arrow key 212 and the arrow keypad 210 shown with respect to FIG. 6. An advantage to preprocessing and transmitting several possible screen views 254, 257, 260, 262, 265, 268, 271 is that wireless communication device may be able to change between views more quickly. One reason is that the wireless communication device does not have to wait for processing and transmission of new views once the initial processing and transmission is complete.

Figure 8:
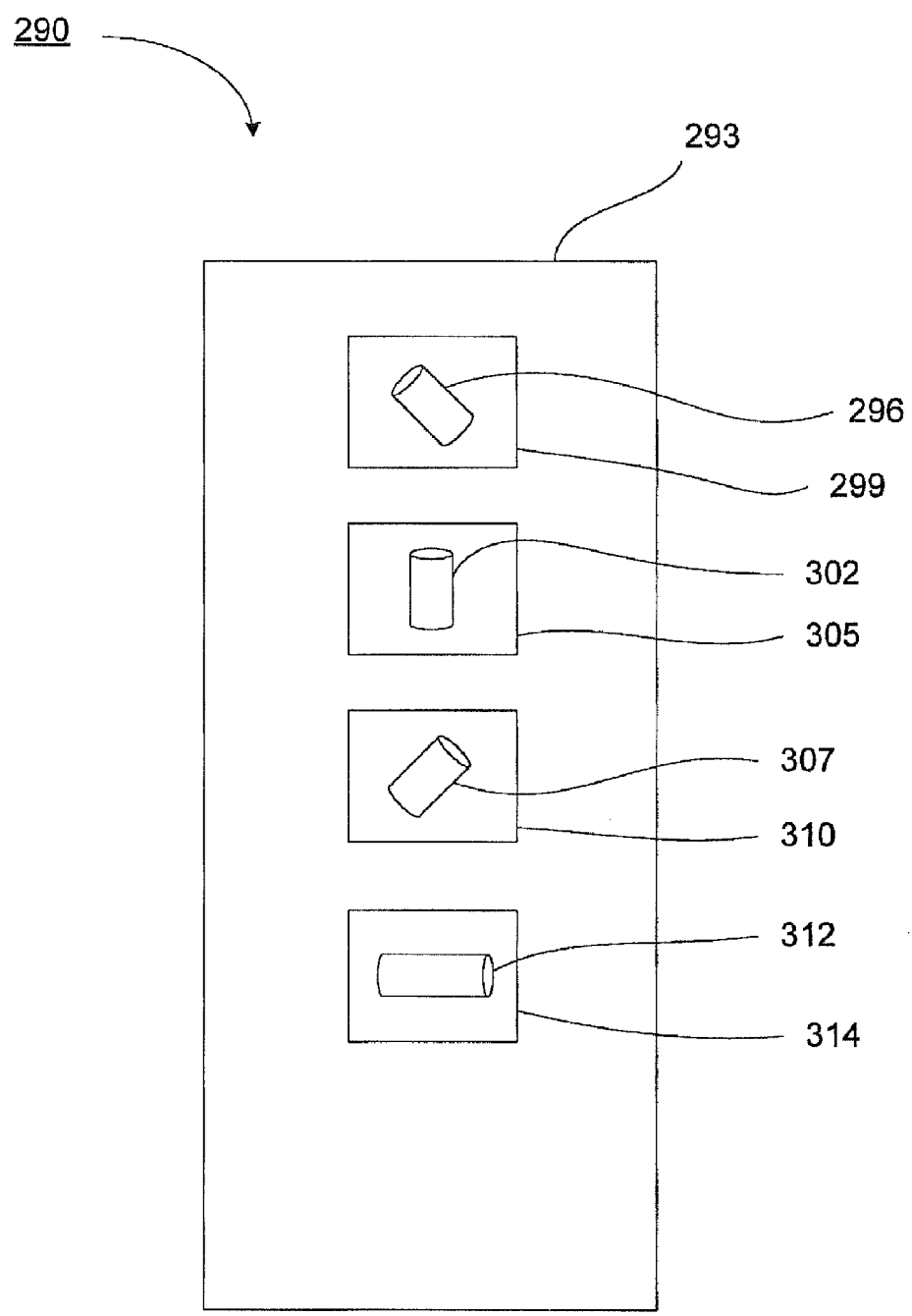
FIG. 8 is a diagram illustrating several wireless communication device screens.

Referring now to FIG. 8 a diagram 290 is shown. The diagram 290 is similar to diagram 250 of FIG. 7. FIG. 8 shows preprocessed screen views 299, 305, 310, 314, however, these screen views 299, 305, 310, 314 do not show a selection of menu items. FIG. 8 shows several views of a graphical element 296, 302, 307, 312. A simple graphical element is shown for illustrative purposes. It will be understood that more complex graphics may commonly be processed this way. The screen views 299, 305, 310, 314 are preprocessed similarly to the screen views 254, 257, 260, 262, 265, 268, 271 shown on FIG. 7. Also similar to FIG. 7 the screen views are stored in a memory 293. The memory 293 of FIG. 6 is similar to the memory 252 of FIG. 7. As shown in FIG. 8, preprocessed screen views are not limited to menus on a wireless communication device. Graphical elements can be processed, for example, a three-dimensional object can be generated shown on a screen and rotated. Advantages include the ability to display complicated images on a wireless communication device screen more efficiently.

Figure 9:
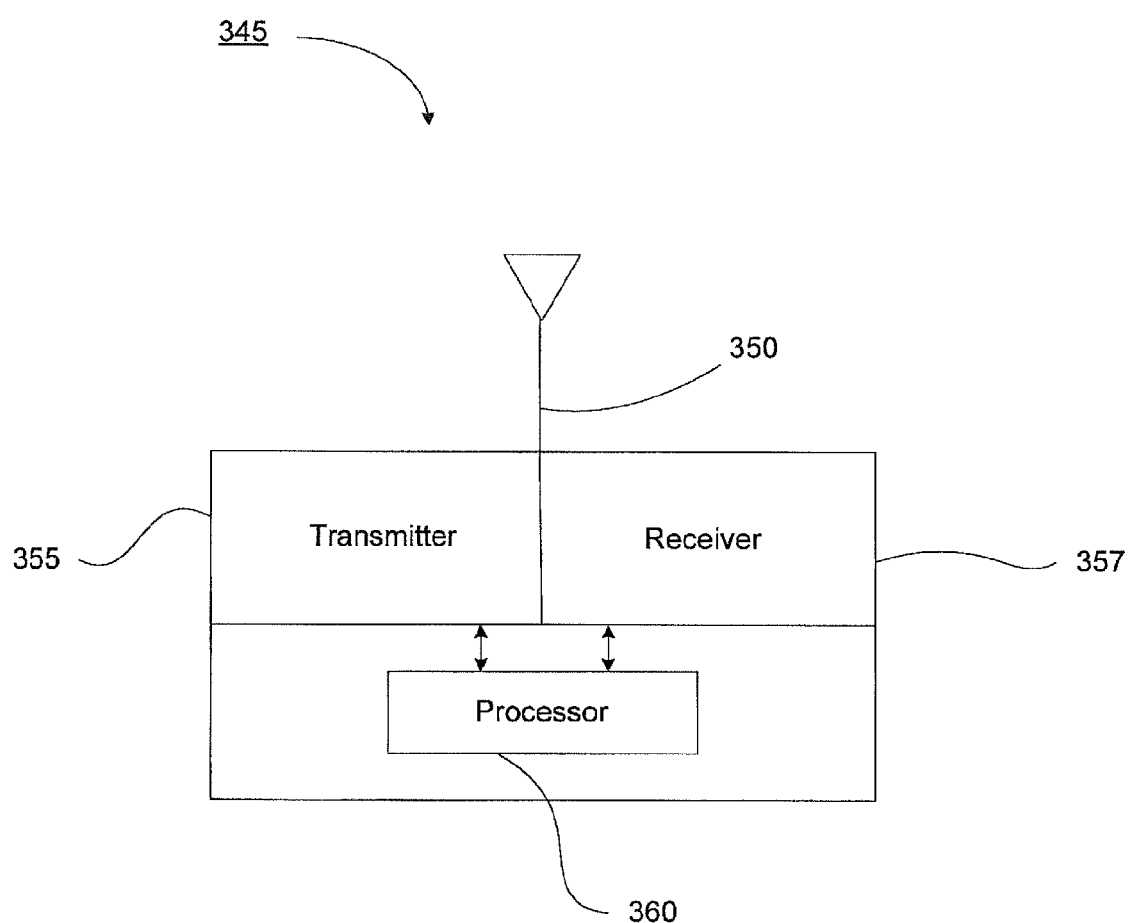
FIG. 9 is a block diagram of a transceiver.

FIG. 9 will now be discussed. In FIG. 9 a diagram 345 of a transceiver 352 is shown. The transceiver is the same or similar to the transceiver 55 of FIG. 1. FIG. 9 shows a transceiver 55, the transceiver 55 includes a processor 360 that may be used to perform the remote processing functions previously discussed.

The diagram 345 includes an antenna 350. The antenna 350 is coupled to a transmitter 355 and a receiver 357. The receiver is used to receiver wireless requests from a wireless communication device. It will be clear to one of skill in the art that the receiver 357 can generally be used to receiver other signals. The wireless requests received by the receiver 357 are generally sent to the processor 360. The processor 360 performs a processor function received in the wireless request and the result of the processor function is transmitted to the wireless communication device. Advantages may generally include the possibility of increasing processor functionality by changing the processor 360 that is used.

Figure 10:
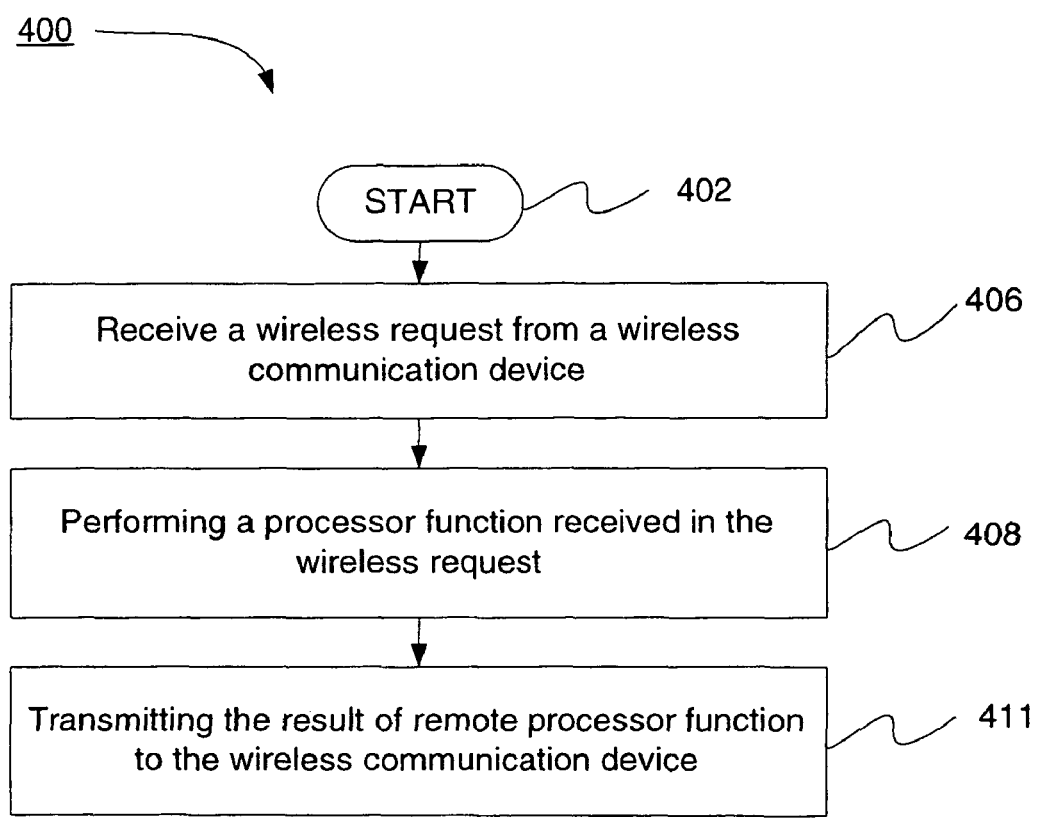
FIG. 10 is a flowchart that details the steps that can be performed at a transceiver.

A flowchart 400 is shown in FIG. 10. The flowchart 400 details the steps that can be performed at a transceiver, such as, for example the transceiver discussed with respect to FIG. 9. The flowchart starts at step 402. A wireless request is received from a wireless communication device in step 406. The wireless request generally includes a processor function to be performed by a processor. In step 408 the processor function is performed. Step 408 is similar to steps 113, 162, and 184 of FIGS. 3, 4, and 5 respectively. The result of the processor function is transmitted to the wireless communication device in step 411. Step 411 is similar to steps 116, 164, and 187 of FIGS. 3, 4, and 5 respectively. An advantage may include lower costs to produce a mobile handset when processing is offloaded to a remote processor. However, it will be clear to one of skill in the art that in some cases costs may not be lowered. For example, in some cases it may be advantageous to increase processing functionality available to a mobile handset while receiving little or no costs savings in the manufacturing of the handset.

We claim:

1. A method of off-loading processor functions in a wireless communications device, the method comprising:
   selecting a processor function configured to be performed on a processor of the wireless communications device to generate a wireless communication device result, wherein the selecting a processor function comprises applying a set of rules stored in a memory at the wireless communication device;
   evaluating the selected processor function at the wireless communications device by comparing the selected processor function to a list stored in a memory of the wireless communications device;
   determining to offload the processor function to a remote processor based on said comparison;
   transmitting a wireless request to a remote processor to perform the offload processor function;
   processing a portion of the offloaded processor function at the wireless communication device to generate a result;
   performing the processor function at the remote processor to generate a remote processor result;
   transmitting a portion of the remote processor result to the wireless device based on the result of the processed portion at the wireless device of the offloaded processor function;
   receiving the wirelessly transmitted portion of the remote processor result at the wireless device from the remote processor, wherein the remote processor result is the same result obtained if the offloaded processor function was processed at the wireless communication device;
   pre-processing additional non-requested processor functions at the remote processor to generate pre-processed results, the additional non-requested processor functions configured to be performed on a processor of the wireless communications device;
   receiving results of the non-requested pre-processed processor functions at the wireless device from the remote processor; and
   storing the non-requested pre-processed processor functions in a memory at the wireless device.

2. The method of claim 1 wherein the processor function is a user interface function.

3. The method of claim 1 wherein the processor function is a wireless communication device telephone number list.

4. The method of claim 1 wherein the processor function is a display function.

5. The method of claim 4 wherein the display function includes an update to a wireless communication device screen.

6. The method of claim 5 wherein the update to a wireless communication device screen includes multiple updates to the wireless communication device received from the remote processor and stored in a memory.

7. The method of claim 1 wherein the processor function is a keypad function.

8. The method of claim 1 wherein the processor function is a sound function.

9. The method of claim 8 wherein the sound function is a voice recognition function.

10. The method of claim 1 wherein the processor function is a function related to a wireless communication device web browser.

11. The method of claim 10 wherein the processor function related to the wireless communication device web browser is a process markup language function.

12. The method of claim 11 wherein the markup language function consists of hypertext markup language.

13. The method of claim 11 wherein the markup language function consists of wireless markup language.

14. The method of claim 11 wherein the markup language function consists of extensible markup language.

15. The method of claim 1, wherein the selecting a processor function further comprises consulting a list of processor functions stored in memory at the wireless device.

16. A wireless communications device comprising:
   a processor configured to perform the following steps:
   selecting a processor function configured to be performed on the processor of the wireless communications device to generate a wireless communication device result, wherein the selecting a processor function comprises applying a set of rules stored in a memory at the wireless communication device;
   determining to offload the processor function to a remote processor based on a comparison of the processor function to a list stored in a memory of the wireless communication device;
   instructing the remote processor to perform the processor function to generate a result and analyze the result to determine a partial result;
   receiving said partial result via a wireless transmission;
   receiving partial pre-processed results of one or more the non-requested pre-processed processor functions at the wireless device from the remote processor; and
   storing said partial pre-processed results of the non-requested pre-processed processor functions in a memory at the wireless device;
   a transceiver coupled to the processor;

an antenna coupled to the transceiver;

a user interface coupled to the processor;

a mobile power source configured to power the processor; and a case enclosing the transceiver, processor, and the mobile power source.

17. The wireless communications device of claim 16 wherein the processor function is a user interface function.

18. The wireless communications device of claim 16 wherein the processor function is a display function.

19. The wireless communications device of claim 18 wherein the display function includes an update to the wireless communication device screen.

20. The wireless communications device of claim 16 wherein the processor function is a function related to a wireless communication device web browser.

21. The wireless communications device of claim 20 wherein the processor function related to the wireless communication device web browser is a process markup language function.

22. The wireless communications device of claim 21 wherein the markup language function consists of hypertext markup language.

23. The wireless communications device of claim 21 wherein the markup language function consists of wireless markup language.

24. The wireless communications device of claim 21 wherein the markup language function consists of extensible markup language.

25. A method of off-loading processor functions in a wireless communications device, the method comprising:

selecting a processor function configured to be performed on a processor of the wireless communications device to generate a wireless communication device result, wherein the selecting a processor function further comprises applying a set of rules stored in a memory at the wireless communication device;

evaluating the selected processor function at the wireless communications device by comparing the selected processor function to a list stored in a memory of the wireless communications device;

determining to offload the processor function to a remote processor based on said comparison;

transmitting a wireless request to a remote processor to perform the offload processor function;

performing the processor function at the remote processor to generate a result;

analyzing the result to determine a partial result;

transmitting said partial result to the wireless device;

receiving the partial result at the wireless device from the remote processor;

pre-processing additional non-requested processor functions at the remote processor to generate pre-processed results, the additional non-requested processor functions configured to be performed on a processor of the wireless communications device;

analyzing the pre-processed results to determine partial pre-processed results;

receiving said partial pre-processed results of the non-requested pre-processed processor functions at the wireless device from the remote processor; and storing said partial pre-processed results of the non-requested pre-processed processor functions in a memory at the wireless device.

\* \* \* \* \*